July 1, 1969  A. D. HOLIDAY  3,453,343
METHOD OF REMOVING CATALYST POISONING IMPURITIES
FROM A CARRIER STREAM
Filed March 6, 1967
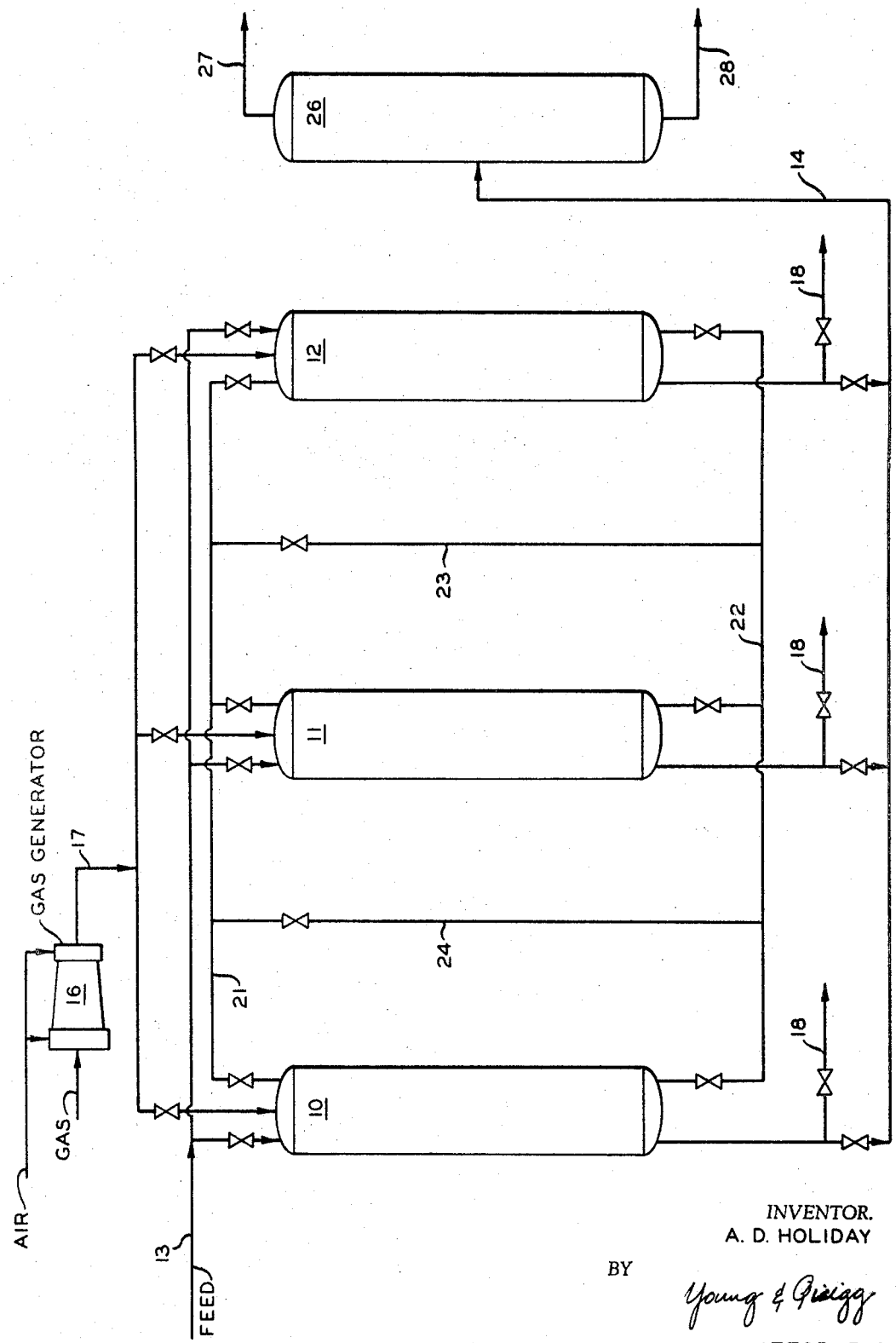
INVENTOR.
A. D. HOLIDAY
BY
*Young & Griggs*
ATTORNEYS United States Patent Office 3,453,343
Patented July 1, 1969

3,453,343
METHOD OF REMOVING CATALYST POISONING IMPURITIES FROM A CARRIER STREAM
Allan D. Holiday, Bartlesville, Okla., assignor to Phillips Petroleum Company, a corporation of Delaware
Filed Mar. 6, 1967, Ser. No. 620,981
Int. Cl. C07c *11/02*
U.S. Cl. 260—676    3 Claims

ABSTRACT OF THE DISCLOSURE

A method of removing catalyst poisoning impurities having an aldehyde or alcohol functional group wherein a carrier stream containing the impurity is contacted with a deactivated catalyst.

This invention relates to a method of removing an impurity that poison catalysts from a feed stream prior to contacting the feed stream with the catalysts.

Polymerization reactions have assumed a position of great prominence in the processing industries in recent years. Polymerized materials are presently utilized in an almost infinite variety of applications and new applications are emerging daily. Of particular value as polymerization feed materials are hydro-carbon olefins and particularly 1-olefins.

Polymerization is often effected through contacting the monomer with a catalyst. While the ability of the catalyst to effect polymerization diminishes over a period of time, this diminution is greatly accelerated by the presence of certain impurities, or "poisons," in the particular feed stream being polymerized.

Since these poisons are highly undesirable, a method of removing them is of significant value. The invention provides a method of substantially removing certain impurities from a feed stream prior to catalytic polymerization, where the impurity contains an aldehyde or alcohol functional group. According to the invention, the substantial removal of the impurity is accomplished by passing the feed containing the impurity over a catalyst which has been previously used in a catalytic reformation step. The contacting step is carried out at sufficient temperature and pressure to decompose the impurity without chemically altering the feed. This catalyst, whose activity is greatly reduced or completely destroyed by reason of its previous use, is referred to in this application as "spent" catalyst.

Accordingly, it is an object of the invention to provide a method of impurities removal.

Another object of this invention is to provide a method of destroying functional groups attached to a molecule.

Another object of this invention is to destroy certain functional groups attached to a molecule.

Another object of this invention is to utilize spent catalysts.

Other objects and advantages of this invention will be apparent to one skilled in the art upon consideration of the following description, the drawing, and appended claims.

The figure is a flow diagram of one system which can be utilized in the practice of the invention.

In one embodiment, this invention comprises a method of substantially removing impurities containing an aldehyde functional group, for example, furfural, from a feed stream of isobutene and butene-1 by contacting the above impurities with a silica-alumina catalyst rendered inactive for the polymerization of butene-1 or isobutene by virtue of its prior use for that purpose.

In another embodiment, this invention comprises a method of substantially removing impurities containing an alcohol functional group, for example, isopropyl alcohol, from a heptane feed by contacting the feed stream with a spent silica-alumina catalyst.

Those materials designated as impurities, or poisons, will vary in composition according to the catalyst being employed; however, it is known that compounds containing a carbon-oxygen linkage or a carbon-hydroxyl linkage in a functional group attached to a molecule containing carbon quickly reduce the activity of both metallic oxide and non-metallic oxide catalysts. Specifically, molecules containing an aldehyde or an alcohol group are known to behave as poisons for catalysts comprising silica-alumina, nickel oxide on silica-alumina, chromium oxide on silica alumina, cobalt oxide on silica-alumina, and chromium oxide on molybdenum oxide are poisoned by molecules containing less than ten carbon atoms and containing a carbonyl linkage. The poisoning effect of furfural on silica-alumina is well known.

Referring now to the figure, zones 10, 11 and 12 are connected with a feed conduit 13 and a product removal conduit 14. A regeneration gas generator 16 is connected by conduit 17 to each of the zones. Each zone is provided with a regeneration gas vent 18. A manifold system comprising conduits 21, 22, 23, and 24 interconnects all of the zones so that the zones may be used interchangeably for catalytic reformation, impurity removal, or regeneration as is hereinafter described. The system is provided with a product recovery zone 26 having outlets 27 and 28. The invention is described below with reference to specific compositions and conditions but it is to be understood that the invention is not limited to this particular embodiment.

In the practice of the invention, a carrier feed stream of isobutene and 1-butene containing a furfural impurity flows through conduit 13 to zone 10, which contains spent alumina-silica catalyst and is used for impurity removal. Impurity removal zone 10 is maintained at from 50–150° F. and at from 100–300 p.s.i.g. Under these conditions, contact of the furfural with the spent silica-alumina catalyst reduces the furfural to elemental carbon and water, but the isobutene and 1-butene are not chemically altered.

After furfural stripping, the feed stream is removed from zone 10 via conduit 22 and flows through conduits 24 and 21 into zone 11 which contains active silica-alumina catalyst and wherein polymerization conditions are maintained. The isobutene is selectively polymerized by contact with the active catalyst in zone 11. This polymerization results from the active as opposed to spent catalyst in zone 10.

The stream of 1-butene and polyisobutene is removed from polymerization zone 11 via conduit 14 to product recovery zone 26 where the stream is fractionated; 1-butene being recovered overhead through conduit 27 and the polymer being recovered through conduit 28.

In this particular embodiment, silica-alumina catalyst contained in zone 12 has been used first for polymerization and then for impurity removal. During the time that zones 10 and 11 are on stream the catalyst in zone 12 can be regenerated by flowing regeneration gas from the generator 16 through conduit 17 into zone 12. Regeneration gas can be produced by combustion of natural gas to obtain inert components and mixing these with air. After contact with the alumina-silica catalyst, regeneration gas is removed from zone 12 via vent line 18.

When either the impurity removal catalyst in zone 10 or the polymerization catalyst in zone 11 has been rendered too inactive to be effective, the zones are rotated by means of the manifold and piping illustrated so that zone 11, formerly a polymerization zone, receives feed from conduit 13 and removes the furfural impurities therefrom, zone 12, formerly a regeneration zone, receives furfural-stripped feed through conduit 21 polymerizing the feed, and zone 10, formerly for impurity removal, is being regenerated. The three zones can be rotated indefinitely in this manner.

In this embodiment, the spent catalyst is the same catalyst that was used to polymerize the feed stream; however, this invention is to be understood to be broad enough to allow any spent catalyst to be used regardless of whether or not the primary use of the catalyst is to process the materials comprising the feed stream. The following example will further illustrate the invention.

EXAMPLE I

Three separate and identical vessels containing equal amounts of silica-alumina catalyst were rotated through the successive steps of polymerization, impurities removal, and regeneration as is explained with reference to the drawing. A feed stream of approximately 14,585 pounds per hour consisting of 2 percent isobutene, 80 percent 1-butene, furfural impurities and inert components was introduced into an impurity removal zone where the furfural was reduced to elemental carbon over spent silica-alumina catalyst at 100° F. and at 200 p.s.i.g.

The stream of isobutene and 1-butene was then introduced into a polymerization zone where the isobutene was selectively polymerized. This stream of 14,583 pounds per hour (feed weight minus the weight of furfural) containing polymer and monomer was then introduced into a polymer removal zone where the polymer was recovered from the monomer, and both were sent to further processing.

The catalyst in the third vessel was regenerated during this time. The carbon resulting from the decomposition of furfural and other inert components were removed from the silica-alumina catalyst by contacting the catalyst with 100 standard cubic feet of regeneration gas per cubic foot of catalyst per hour for three hours at 1,000° F. and at 20 p.s.i.g.

Subsequently, the polymerization catalyst in the second vessel lost sufficient activity to effect polymerization. When this happened, the vessels were rotated; wherein the polymerization zone was then used as the impurities removal zone was regenerated, and the regeneration zone was used as a polymerization zone. The vessels were again rotated in this manner.

The tabular results of several runs are presented in Table I. As indicated in Table I the effectiveness of furfural removal was demonstrated by measuring the amount of furfural in weight parts per million in the feed before and after contact with the spent catalyst. These runs were made for varying time periods. Additionally, data was obtained, as indicated in Table II, showing the polymerization zone on stream time before catalyst poisoning for three different concentrations of furfural in the feed stream.

TABLE I

| Hours on stream | Furfural in feed before contact with spent catalyst wt. p.p.m. | Furfural in feed after contact with spent catalyst, wt. p.p.m. |
|---|---|---|
| 5 | 153 | <5 |
| 10 | 61 | <5 |
| 15 | 123 | <5 |
| 20 | 89 | <5 |
| 25 | 104 | <5 |

TABLE II

| Furfural concentration in polymerization zone feed, wt. p.p.m. | Polymerization zone on stream time before catalyst poisoning, hours |
|---|---|
| 1-3 | 100 |
| 10 | 40 |
| 125 | 6-8 |

Examination of Table I indicates that the furfural in the feed after spent catalyst contact was negligible regardless of the amount of furfural in the feed before contact with the spent catalyst. This clearly demonstrates that the spent catalyst effectively removes substantially all of the furfural from the olefin feed for various concentrations of furfural and various on stream times.

The data in Table II indicates that when the concentration of furfural in the feed increases, the duration of catalyst activity for polymerization rapidly decreases. This clearly demonstrates the need for the invention.

EXAMPLE II

To demonstrate the removal of an alcohol from a carrier stream by a spent catalyst, normal heptane which analyzed 310 parts per million by weight isopropyl alcohol was treated over 50 cc. of a high silica-alumina catalyst (90 percent $SiO_2$, 10 percent $Al_2O_3$) at 6 LHSV at 100° F. and at 200 p.s.i.g. The effluent analyzed as 30 parts per million by weight isopropyl alcohol; this was the lower level of sensitivity of the analytical procedure. This test clearly indicates that an alcohol can be removed from a hydrocarbon carrier stream by contact with a silica-alumina catalyst.

A reasonable modification and variation are within the scope of this invention which sets forth a novel method of removing impurities.

That which is claimed is:

1. A method of removing impurities from a carrier stream passing to a catalytic reformation comprising the steps of:

contacting, in a contacting zone, a spent catalyst selected from the group consisting of silica-alumina, nickel oxide on silica-alumina, cobalt oxide on silica-alumina, and chromium oxide on molybdenum oxide, with said carrier stream containing at least one said impurity reductive of catalyst life selected from the group consisting of compounds containing an aldehyde functional group and compounds containing an alcohol functional group and containing less than 10 carbon atoms, said contacting zone being maintained at sufficient temperature and sufficient pressure to decompose said material without chemically altering the carrier stream wherein the pressure is from 100 to 300 p.s.i.g. and the temperature is from 50 to 150° F.

2. The method of claim 1 wherein:
the carrier stream comprises isobutene and 1-butene; said material reductive of catalyst life comprises furfural.

3. The method of claim 1 wherein:
said carrier stream comprises n-heptane;
said material reductive of catalyst life comprises isopropyl alcohol.

References Cited

UNITED STATES PATENTS 3,105,858 10/1963 Kresge et al.     260—681.5
2,775,637 12/1956 Lanning et al.     260—683.15
3,086,066 4/1963 Breiter et al.     260—677

DELBERT E. GANTZ, *Primary Examiner.*

J. D. MYERS, *Assistant Examiner.*

U.S. Cl. X.R.

260—677